US008514748B2

(12) United States Patent
Iyer et al.

(10) Patent No.: US 8,514,748 B2
(45) Date of Patent: *Aug. 20, 2013

(54) METHOD AND SYSTEM FOR IMPROVED AUTHENTICATION FOR COMMUNICATIONS NETWORK SETUP

(75) Inventors: Mahesh Iyer, Sunnyvale, CA (US); Henry Ptasinski, San Francisco, CA (US); David Lawrence Cohen, Sunnyvale, CA (US); Clinton W. Brown, Monte Sereno, CA (US)

(73) Assignee: Broadcom Corporation, Irvine, CA (US)

( * ) Notice: Subject to any disclaimer, the term of this patent is extended or adjusted under 35 U.S.C. 154(b) by 2124 days.

This patent is subject to a terminal disclaimer.

(21) Appl. No.: 11/208,346

(22) Filed: Aug. 18, 2005

(65) Prior Publication Data

US 2006/0039306 A1 Feb. 23, 2006

Related U.S. Application Data

(60) Provisional application No. 60/694,230, filed on Jun. 27, 2005, provisional application No. 60/671,120, filed on Apr. 14, 2005, provisional application No. 60/602,396, filed on Aug. 18, 2004.

(51) Int. Cl.
*H04K 1/00* (2006.01)

(52) U.S. Cl.
USPC ............ 370/270; 713/168; 713/189; 713/193

(58) Field of Classification Search
USPC .......................................... 713/168, 189, 193
See application file for complete search history.

(56) References Cited

U.S. PATENT DOCUMENTS 5,930,358 A * 7/1999 Rao ................................ 713/193
7,254,367 B2 * 8/2007 Helden et al. ................ 455/41.2
7,398,550 B2 * 7/2008 Zick et al. ......................... 726/5
2002/0077077 A1 * 6/2002 Rezvani et al. ............... 455/410
2003/0212889 A1 * 11/2003 Khieu et al. .................. 713/164
2004/0203590 A1 * 10/2004 Shteyn .......................... 455/410

OTHER PUBLICATIONS

IEEE Std 802.1X™—2004, "IEEE Standard for Local and metropolitan area networks: Port-Based Network Access Control", pp. 1-51, Dec. 13, 2004.
IEEE Std 802.11™, 2003 Edition, "Information technology—Telecommunications and information exchange between systems—Local and metropolitan area networks—Specific requirements—Part 11: Wireless LAN Medium Access Control (MAC) and Physical Layer (PHY) Specifications", pp. 9-65, Jun. 12, 2003.

* cited by examiner

*Primary Examiner* — Kaveh Abrishamkar
(74) *Attorney, Agent, or Firm* — Garlick & Markison; Edward J. Marshall

(57) ABSTRACT

Aspects of a system for enabling secure wireless communication of information between stations in a communication system may comprise a configurator, that exchanges configuration information with a client station, in an IEEE 802.11 communication system. The exchange of configuration information may be encrypted based on information transmitted between the configurator and the client station via a communication network, and information that remains locally on the configurator and locally on the client station. Aspects of a method for enabling secure wireless communication of information between stations in a communication system may comprise exchanging configuration information between a configurator and a client station, in an IEEE 802.11 communication system. The exchanged configuration information may be encrypted based on information transmitted between the configurator and the client station via a communication network, and information that remains locally on the configurator and locally on the client station.

27 Claims, 13 Drawing Sheets

METHOD AND SYSTEM FOR IMPROVED AUTHENTICATION FOR COMMUNICATIONS NETWORK SETUP

CROSS-REFERENCE TO RELATED APPLICATIONS/INCORPORATION BY REFERENCE

This application makes reference to, claims priority to, and claims the benefit of:
U.S. Provisional Application Ser. No. 60/694,230 filed Jun. 27, 2005;
U.S. Provisional Application Ser. No. 60/602,396 filed Aug. 18, 2004; and
U.S. Provisional Application Ser. No. 60/671,120 filed Apr. 14, 2005;
This application makes reference to:
U.S. application Ser. No. 11/207,302 filed Aug. 18, 2005;
U.S. application Ser. No. 11/207,262 filed Aug. 18, 2005, issued as U.S. Pat. No. 7,653,036 on Jan. 26, 2010;
U.S. application Ser. No. 11/207,658 filed Aug. 18, 2005;
U.S. application Ser. No. 11/208,081 filed Aug. 18, 2005;
U.S. application Ser. No. 11/208,310 filed Aug. 18, 2005;
U.S. application Ser. No. 11/208,275 filed Aug. 18, 2005;
U.S. application Ser. No. 11/207,661 filed Aug. 18, 2005;
U.S. application Ser. No. 11/207,301 filed Aug. 18, 2005, issued as U.S. Pat. No. 7,343,411 on Mar. 11, 2008;
U.S. application Ser. No. 11/208,284 filed Aug. 18, 2005; and
U.S. application Ser. No. 11/208,347 filed Aug. 18, 2005.

Each of the above referenced applications are hereby incorporated herein by reference in their entirety.

FIELD OF THE INVENTION

Certain embodiments of the invention relate to wireless network communications. More specifically, certain embodiments of the invention relate to a method and system for improved authentication for communications network setup.

BACKGROUND OF THE INVENTION

Currently, with some conventional systems, setting up a network generally requires some significant interaction and technical knowledge on the part of a user setting up the network, especially when the user is interested in configuring security options for the network.

In general, 802.11-based networks require a significant amount of user interaction during the configuration process. Typically, with conventional 802.11-based networks, the user needs to configure a new station (STA) to associate to a new access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration of no security, and use a default network name (SSID) that is selected by the manufacturer such as, for example, "Manufacturer Name", "Default", or "wireless". With the proliferation of 802.11 networks, users often experience confusion and network problems when their new AP uses the same SSID as a neighboring AP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for improved authentication for communications network setup, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
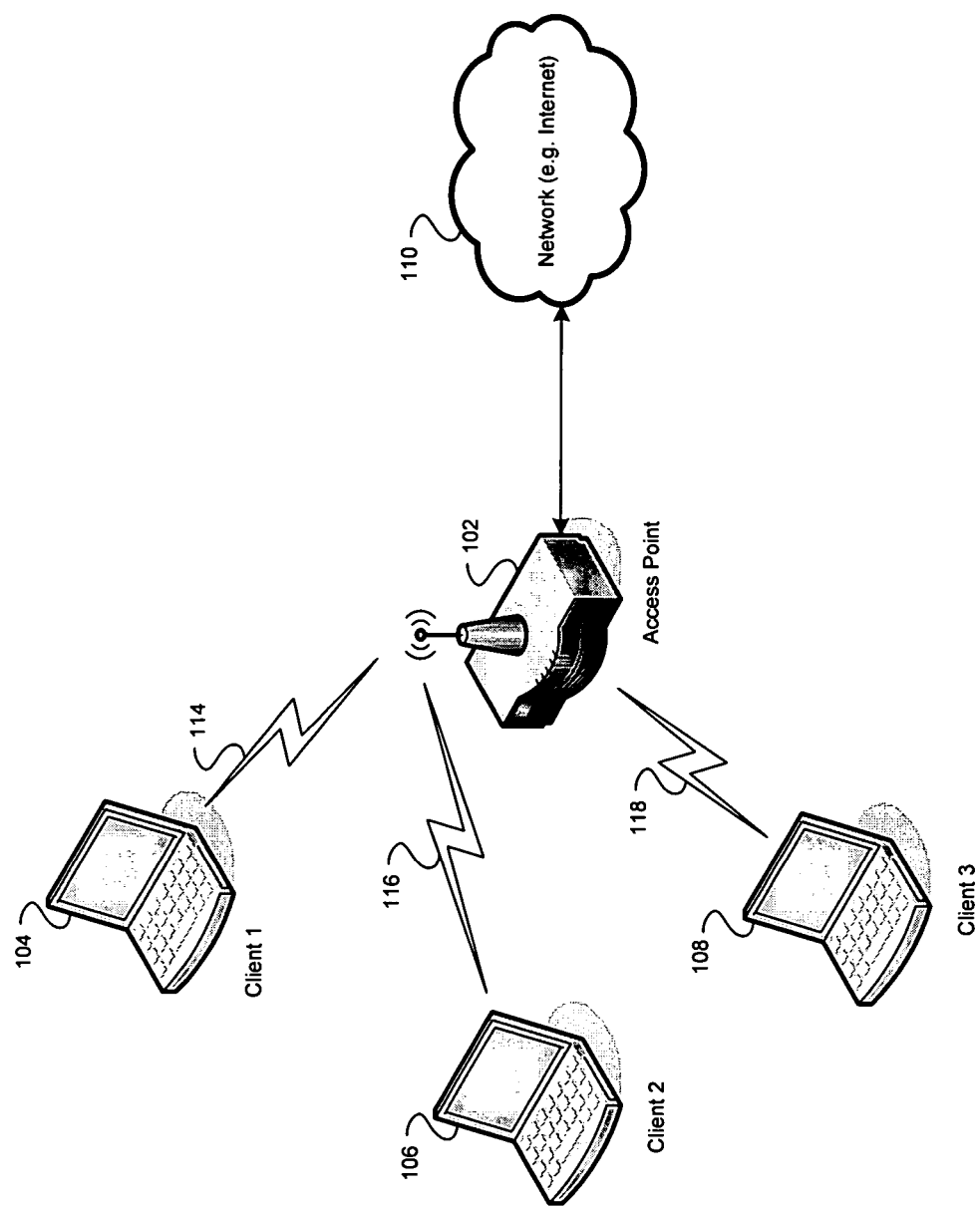
FIG. 1 is a block diagram of an exemplary wireless network, which may be utilized in connection with an embodiment of the invention.

Certain embodiments of the invention may be found in a method and system for improved authentication. Components in a system for communications network setup, in accordance with an embodiment of the invention, may comprise a configurator, and a client. A configurator may alternatively be referred to as a configurator terminal, configurator device, or configurator station. A client may be alternatively referred to as a client terminal, client device, or client station. A configurator station, or a client station, may be referred to as a station. The configurator may be a wireless and/or wired terminal device, an Ethernet switching device, or other device in an IEEE 802 local area network (LAN) and/or WLAN. The configurator may be located in an access point, for example. The configurator may provide a configuration service to configure clients, thereby enabling the configured clients to utilize secure RF channels in a WLAN with little interaction required from the user. The client may be a wireless or wired terminal device, an Ethernet switching device, or other device in an IEEE 802 LAN or WLAN.

In IEEE 802.11 wireless local area network (WLAN) systems, wireless terminal devices, or wireless terminals, for example personal computers or personal digital assistants, may communicate via radio frequency (RF) channels that may be monitored by unauthorized parties at terminal devices that were not intended to participate in the communication. IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Authentication may comprise a process of steps that identify a user of a wireless terminal device. Enabling a user of a wireless terminal device to obtain authorization and to utilize encryption may require the user to manually configure the wireless terminal. The manual configuration, however, may require a user to possess a level of knowledge about the WLAN that may exceed that of a typical user. Various embodiments of the invention may comprise a method that may minimize user interaction and knowledge required to configure a wireless terminal for secure communications in an IEEE 802.11 wireless local area network (WLAN).

The exchange of configuration information between the configurator and the client, which may occur during configuration of the client, may require a secure RF channel to prevent an unauthorized user from receiving the configuration information and subsequently spoofing as an authorized user on the WLAN. One method for obtaining a secure RF channel may comprise an exchange of encryption keys. For example, the configurator may generate a key and communicate the configurator key to the client station. Subsequently, the client station may generate a key and communicate the client key to the configurator. The configurator may then utilize the configurator key and the client key to generate an encryption key that, in turn, may be utilized to encrypt the configuration information prior to transmission via the RF channel. The client station that receives the encrypted configuration information may utilize the configurator key and the client key to generate a decryption key that, in turn, may be utilized to decrypt the configuration information.

One limitation of this approach is that the exchange of keys may occur in an unsecured RF channel where the client and configurator have no confirmation that they are exchanging keys and/or configuration information with the correct party. Therefore, an unauthorized user may monitor the RF channel and impersonate the configurator and/or the client to capture the exchanged keys and/or configuration information. The unauthorized user may then be able to decrypt the configuration information transmitted via the secured RF channel, and subsequently be able to spoof as an authorized user.

In one aspect of the invention, information in addition to the exchange of keys may be utilized during configuration of the client station. This additional information may comprise information that is local to the configurator and local to the client station, which is not transmitted via an RF channel. The information that is local to the configurator and/or client station may comprise information that is entered by a user via an input and output device. For example, an input and output device may comprise a keyboard button, a touchscreen, or a computer disk drive or other device that receives information stored in a computer storage device. The additional information may reduce the likelihood that an unauthorized user will utilize configuration information that was intended to be utilized only by an authorized user.

FIG. 1 is a block diagram of an exemplary wireless network, which may be utilized in connection with an embodiment of the invention. Referring to FIG. 1, there is shown an access point (AP) 102, and a plurality of client stations (STA) 104, 106, and 108, a plurality of RF channels 114, 116, and 118, and a network 110. In various embodiments of the invention, an access point may also be referred to as a configurator. The STAs 104, 106, and 108 may be wireless terminals. The network 110 may be a private or public network, for example, the Internet. The configured STAs 104, 106, and 108 may communicate with the AP 102 via corresponding secure RF channels 114, 116, and 118. The AP 102 may communicate information received from a configured STA 104, 106, or 108 via the Internet 110. An unconfigured STA 104, 106, or 108 may communicate with the configurator 102 to request configuration information. The configurator 102 may configure a requesting STA 104, 106, or 108 via a corresponding RF channel 114, 116, or 118.

Figure 2:
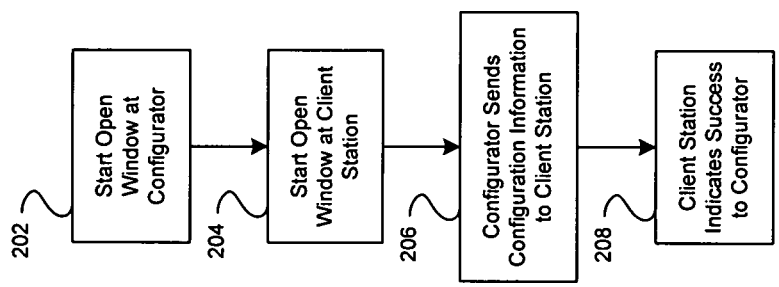
FIG. 2 is a flowchart illustrating exemplary steps performed during configuration of a client station, which may be utilized in connection with an embodiment of the invention.

FIG. 2 is a flowchart illustrating exemplary steps performed during configuration of a client station, which may be utilized in connection with an embodiment of the invention. FIG. 2 presents an exemplary overview of a process that may be utilized by a configurator 102 to configure a STA 104. In step 202, a configurator registration window may be opened by activating a button at the configurator 102. The configurator registration window may comprise a time interval during which a client station 104 may obtain configuration services from the configurator 102. In step 204, a client window may be opened by activating a button at the client station 104. The client window may comprise a time interval during which a client station 104 may attempt to obtain configuration services from the configurator 102. In step 206, the configurator 102 may send configuration information to the client station 104. In step 208, the client station 104 may indicate successful configuration to the configurator 102.

Figure 3:
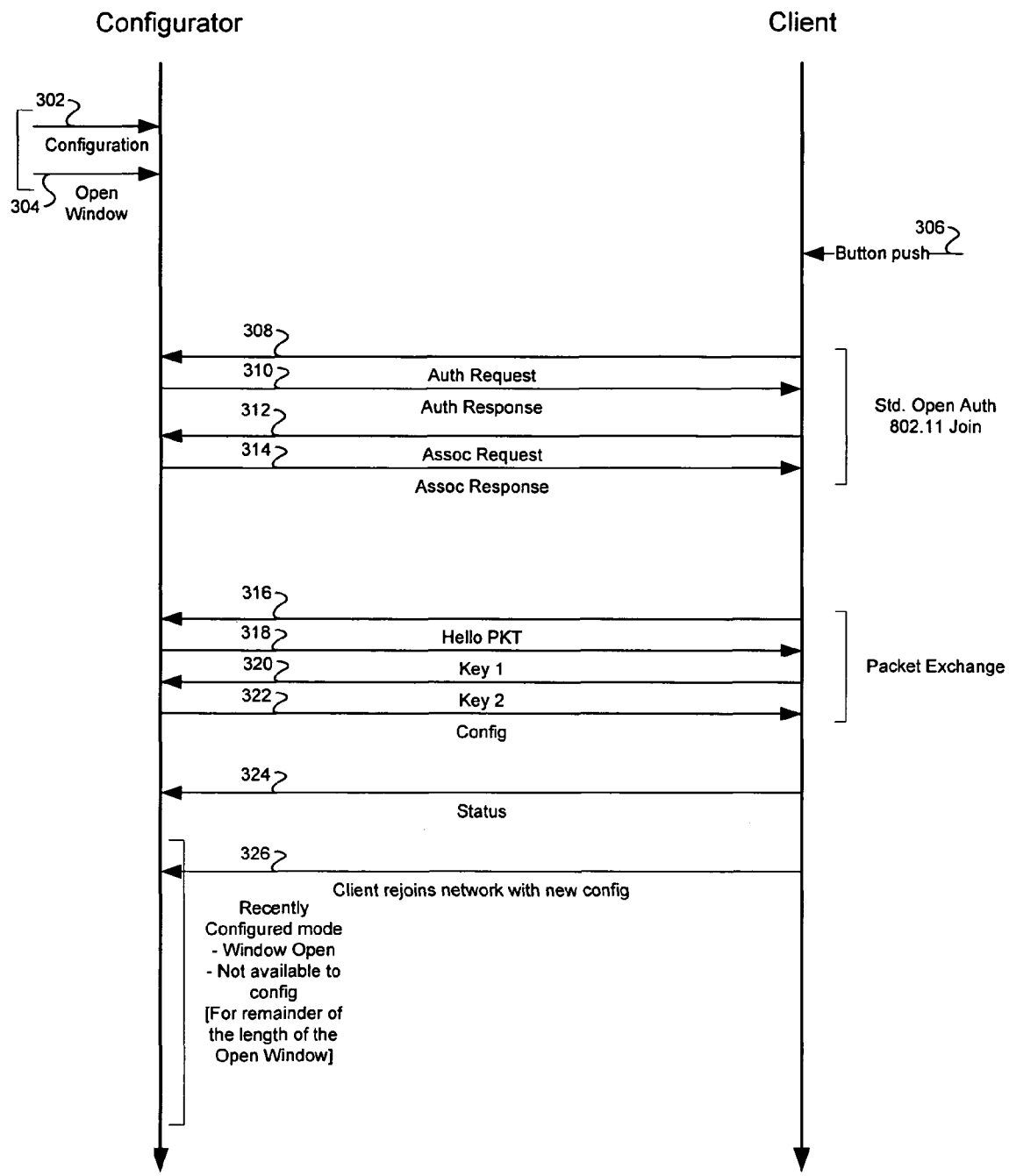
FIG. 3 is a diagram illustrating exemplary message exchanges based on a protocol, which may be utilized in connection with an embodiment of the invention.

FIG. 3 is a diagram illustrating exemplary message exchanges based on a protocol, which may be utilized in connection with an embodiment of the invention. FIG. 3 presents an exemplary exchange of messages between the configurator 102, and the client station 104, based on the protocol. In step 302, the configurator 104 may be configured. The information configured in step 302 may be subsequently utilized by the configurator 102, to configure client stations 104. In step 304, a configurator registration window may be opened at the configurator 102. This process may be substantially as described for step 202 in which opening of the configurator registration window is initiated at the configurator 102. In step 306, a window may be opened at the client station 104. This process may be substantially as described in step 204 in which opening of the client window at the client station 104 is started. Steps 308, 310, 312, and 314 may comprise message exchanges based on IEEE 802.11 comprising an open authentication and join of a basic service set (BSS) as defined in IEEE 802.11. In step 308, an authentication request message may be sent by the client station 104, to the configurator 102. In step 310, the configurator 102 may send an authentication response message to the client station 104. In step 312, the client station 104 may send an association request message 312 to the configurator 102. In step 314, the configurator 102 may send an association response message 314 to the client station 104.

Steps 316, 318, 320, and 322 may comprise a packet exchange based on the protocol. In step 316, the client station 104 may communicate a hello packet to the configurator 102. The hello packet 316 may indicate to the configurator 102 that the client station 104 is ready to be configured. In step 318, the configurator 102 may communicate a key1 message to the client station 104. The key1 message 318 may comprise a configurator key. In step 320, the client station 104 may communicate a key2 message to the configurator 102. The key2 message 320 may comprise a client key.

In step 322, the configurator 102 may communicate a configuration message to the client station 104. The configuration message 322 may comprise configuration information that may be utilized to authenticate a client station 104. The configuration information communicated in the configuration message 322 may be encrypted based on the configurator key and/or the client key. In step 324, the client station 104 may communicate a status message to the configurator 102. The status message 324 may be sent subsequent to decryption of at least a portion of the configuration message 322. The client station 104 may utilize the configurator key and/or the client key to decrypt at least a portion of the configuration message 322 that was previously encrypted by the configurator 102. The status message 324 may indicate whether the client station 104 was successfully configured during the packet exchange. In step 326, the client station 104 may rejoin the WLAN based on the received configuration information. The steps performed during the rejoin 326 may be as defined in IEEE 802.11. The rejoin may occur via a secure RF channel that utilizes the received configuration information in step 322. Subsequent to configuration of the client station 104, the configurator 102 may not be available to configure another client station 106 during the current configurator registration window time interval.

Figure 4:
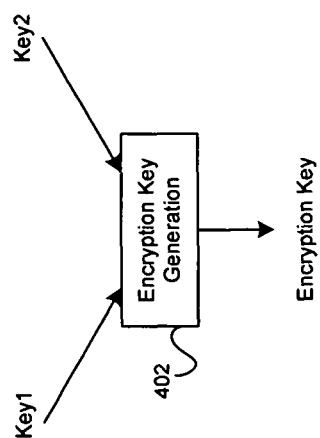
FIG. 4 is a block diagram illustrating exemplary encryption key generation based on keys, which may be utilized in connection with an embodiment of the invention.

FIG. 4 is a block diagram illustrating exemplary encryption key generation based on keys, which may be utilized in connection with an embodiment of the invention. Referring to FIG. 4, there is shown an encryption key generation block 402. The encryption key generation block 402 may utilize a key1, for example a configurator key received in a key1 message 318, and/or a key2, for example, a client key received in a key2 message 320, to generate an encryption key. The encryption key may be utilized to encrypt configuration information that is communicated in a configuration message 322, by a configurator 102 to a client station 104.

Figure 5:
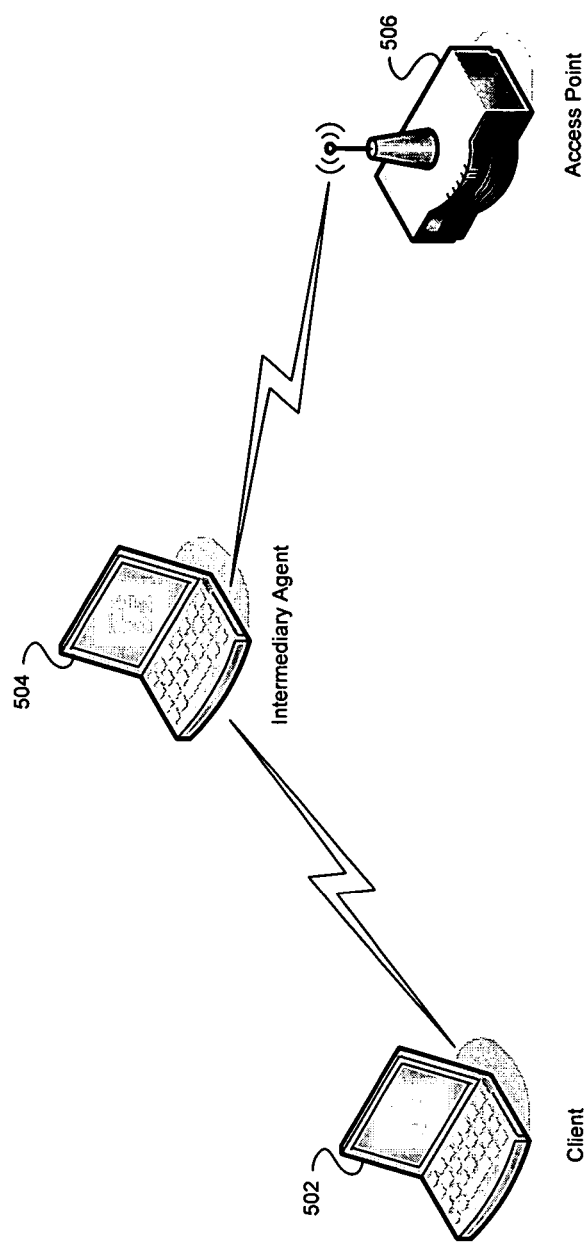
FIG. 5 is diagram illustrating an exemplary intermediary agent attack during authentication, which may occur in connection with an embodiment of the invention.

FIG. 5 is diagram illustrating an exemplary intermediary agent attack during authentication, which may occur in connection with an embodiment of the invention. Referring to FIG. 5, there is shown a client station 502, a intermediary agent 504, and an AP 506. The AP 506 may be utilized as a configurator. FIG. 5 illustrates an exemplary scenario in which a user intends to configure the client station 502 by communicating with the configurator 506, and subsequently exchanging messages, in accordance with the protocol as illustrated in FIG. 3. However, a intermediary agent 504 may intercept messages sent by the client station 502, and block their reception at the configurator 506 via an RF channel. Furthermore, the intermediary agent 504 may initiate an exchange of messages with the configurator 506 via an RF channel, in accordance with the protocol as illustrated in FIG. 3. The intermediary agent 504 may be authenticated by the configurator 506 and subsequently gain unauthorized access to the WLAN.

Figure 6:
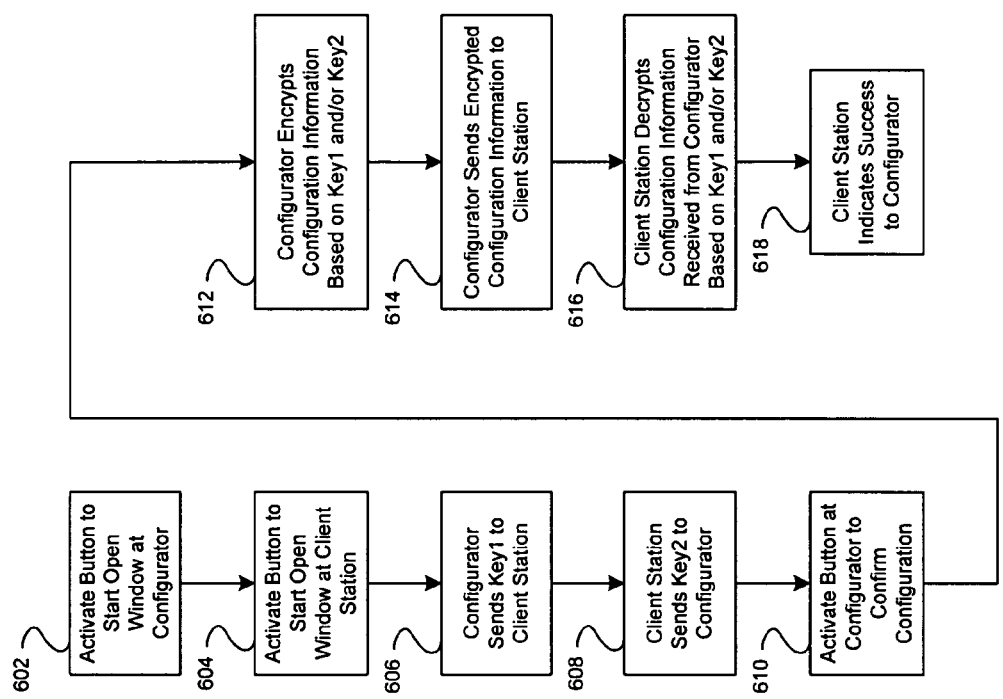
FIG. 6 is a flowchart illustrating exemplary steps for improved authentication for communications network setup that utilizes a confirmation button activation, in accordance with an embodiment of the invention.

FIG. 6 is a flowchart illustrating exemplary steps for improved authentication for communications network setup that utilizes a confirmation button activation, in accordance with an embodiment of the invention. The flowchart of FIG. 6 may follow the exchange of messages between a client station 104 and a configurator 102, in accordance with the protocol as illustrated in FIG. 3. In step 602, a button may be activated at the configurator 102 that opens a registration window. Step 602 may be substantially as described in step 202 in which opening of the configurator registration window is started at the configurator 102. In step 604, a button may be activated at the client station 104 that opens a client window. The client window may be substantially as described in step 204 in which opening of the client window is started at the client station 104. A button at either the configurator 102, or the client station 104, may be a hardware button, or a software button, for example a software button that is displayed in a user interface.

In step 606, the configurator 102 may send a key1 to the client station 104. The key1 may comprise a configurator key that is sent in a key1 message 318, for example. In step 608, the client station 104 may send a key2 to the configurator 102. The key2 may comprise a client key that is sent in a key2 message 320, for example. In step 610, a button may be activated at the configurator 102 to confirm the configuration. The button activation in step 610 may occur subsequent to verification that the client station 104 has received a key1 message, and that the configurator 102 has received a key2 message. In step 612, the configurator 102 may utilize the key1 and/or key2 to generate an encryption key that is subsequently utilized to encrypt configuration information. In step 614, the configurator 102 may send the encrypted configuration information to the client station 104. The encrypted configuration information may be sent in a configuration message 322, for example. In step 616, the client station 104 may use the key1 and/or key2 to generate a decryption key that is subsequently utilized to decrypt the encrypted configuration information. In step 618, the client station 104 may indicate successful configuration status to the configurator 102. Step 618 may be substantially as described in step 208 in which the client station 104 indicates successful configuration to the configurator 102. The indication of successful configuration may be sent in a success message 324, for example.

Figure 7:
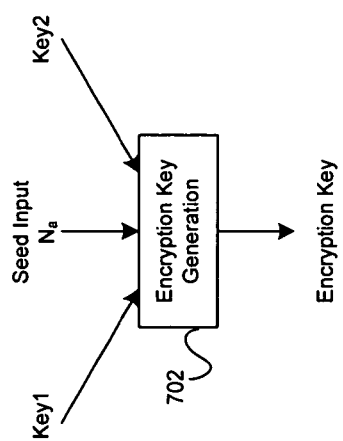
FIG. 7 is a block diagram illustrating exemplary encryption key generation based on keys and a seed number input, in accordance with an embodiment of the invention.

FIG. 7 is a block diagram illustrating exemplary encryption key generation based on keys and a seed number input, in accordance with an embodiment of the invention. Referring to FIG. 7, there is shown an encryption key generation block 702. In another embodiment of the invention, the encryption key generation block 702 may utilize a key1, and/or a key2, and/or a seed input $N_a$, to generate an encryption key. The seed input $N_a$ may comprise information that is not transmitted via an RF channel. Thus, the encryption key, which may be utilized to encrypt configuration information that is communicated in a configuration message 322, by a configurator 102 to a client station 104, may be generated based on key information that is communicated via an RF channel and/or additional information that is not communicated via an RF channel.

Figure 8:
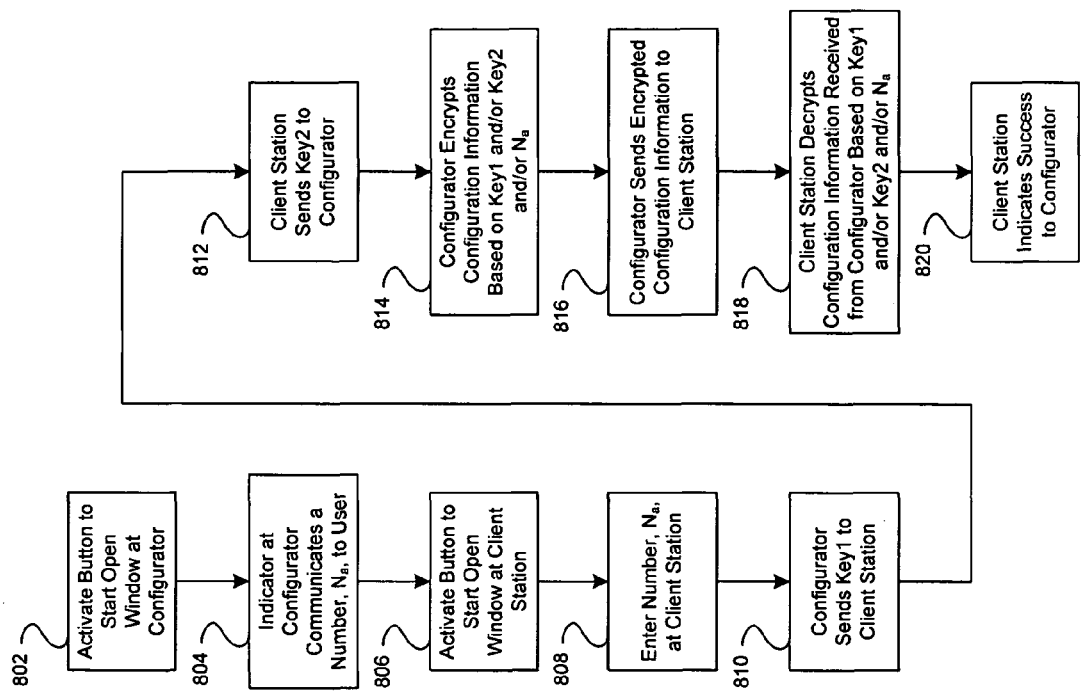
FIG. 8 is a flowchart illustrating exemplary steps for improved authentication for communications network setup that utilizes an automatically generated seed number input, in accordance with an embodiment of the invention.

FIG. 8 is a flowchart illustrating exemplary steps for improved authentication for communications network setup that utilizes an automatically generated seed number input, in accordance with an embodiment of the invention. In the flowchart illustrated in FIG. 8, the configurator 102 may generate a seed number that is subsequently entered at the client station 104. Step 802 may be substantially as described in step 602 in which a button is activated to start opening of the configurator registration window at the configurator 102. In step 804, an indicator at the configurator 102 may communicate a number, $N_a$, to a user. The indicator may be visual and/or audible. The indicator may comprise a visual indication, for example, an illumination that flashes a number of times corresponding to the number $N_a$, or a number displayed in a user interface. The indicator may comprise an audible indication, for example, one or more tones that indicate, either by frequency or length of the tone, or by a number of beeps of the one or more tones, a number corresponding to the number $N_a$.

Step 806 may be substantially as described in step 604 where a button is activated to start opening of the client window at the client station 104. In step 808 a number corresponding to the number $N_a$ may be entered at the client station 104. The seed number may not be communicated between the configurator 102 and the client station 104 via an RF channel. Step 810 may be substantially as described in step 606 in which the configurator 104 sends key1 to the client station 104. Step 812 may be substantially as described in step 608 in which the client station 104 sends key2 to the configurator 102. In step 814, the configurator 102 may utilize the key1 and/or key2, and/or the number $N_a$ to generate an encryption key that is subsequently utilized to encrypt configuration information. Step 816 may be substantially as described in step 614 in which the configurator 102 sends encrypted configuration information to the client station 104.

In step 818, the client station 104 may utilize the key1 and/or key2 and/or the number $N_a$ to generate a decryption key that is subsequently utilized to decrypt the encrypted configuration information. Step 820 may be substantially as described in step 618 in which the client station 104 indicates a success confirmation to the configurator 102.

The number $N_a$ may be randomly chosen, by the configurator 102, from among a range of numbers comprising 1 to a value $N_{max}$ inclusive. For example, the value $N_{max}$ may be 10. A user may verify that the configurator registration window is open based on, for example, a light emitting diode (LED) being illuminated continuously for a time duration, for example, 5 seconds. The configurator 102 may subsequently communicate a value of the number $N_a$ by, for example, blinking an LED, a number $N_a$ times in a cycle, pausing for a period of time, for example 1 or 2 seconds, and repeating the blinking of the LED for a subsequent cycle of blinks. The user may, for example, count the number of blinks of the LED in a cycle to determine the value $N_a$. The user may verify that the client window is open based on, for example, an LED being illuminated continuously for a time duration, for example, 5 seconds, or by an indication in a user interface at the client station 104. The user may enter the value $N_a$ at a client station 104 by, for example, pressing a button at the client station 104 $N_a$ number of times, or by activating a button in a numeric keyboard that corresponds to the number $N_a$. The client station 104, and configurator 102 may utilize the number $N_a$ as a shared secret, S. The number $N_a$ may be utilized in, for example, an authenticated Diffie-Hellman exchange further comprising encapsulating security payload key exchange (ESP-KE), simple password-authenticated exponential key exchange (SPEKE), primary authorization key (PAK), or encrypted key exchange (EKE) protocols, for example.

Various embodiments of the invention may comprise a plurality of button activations. At the configurator 102, there may be 1 button activation. At the client station 104, there may be a range of button activations comprising a minimum of 1 button activation, and a maximum of about $N_{max}$ button activations. A maximum total number of button activations between the configurator 102 and the client station 104 may equal about $1+N_{max}$. An average total number of button activations between the configurator 102 and the client station 104 may equal about $1+(N_{max}+1)/2$. A number of unique shared secrets, S, may be about $N_{max}$. For example, if $N_{max}=10$, the maximum total number of button activations may be 11, the average total number of button activations may be 6.5, and the number of unique shared secrets may be 10.

Figure 9:
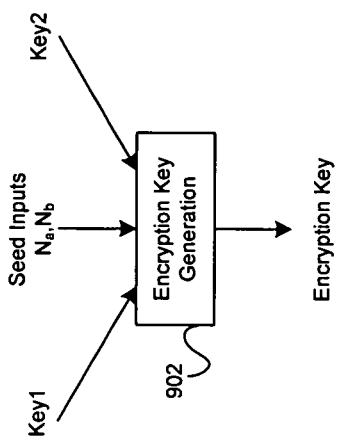
FIG. 9 is a block diagram illustrating exemplary encryption key generation based on keys and a sequence of seed number inputs, in accordance with an embodiment of the invention.

FIG. 9 is a block diagram illustrating exemplary encryption key generation based on keys and a sequence of seed number inputs, in accordance with an embodiment of the invention. Referring to FIG. 9, there is shown an encryption key generation block 902. Inputs to the encryption key generation 902 may comprise key1, key2, and seeds $N_a$ and $N_b$. The seed inputs $N_a$ and $N_b$ may comprise information that is utilized during configuration but which is not transmitted via an RF channel. In this regard, the seed input $N_a$ comprises information that is local to the configurator 102, and $N_b$ comprises information that is local to the client station 104. In another embodiment of the invention, the encryption key generation block 902 may utilize a key1, and/or a key2, and/or a seed input $N_a$, and/or a seed input $N_b$, to generate an encryption key.

Figure 10:
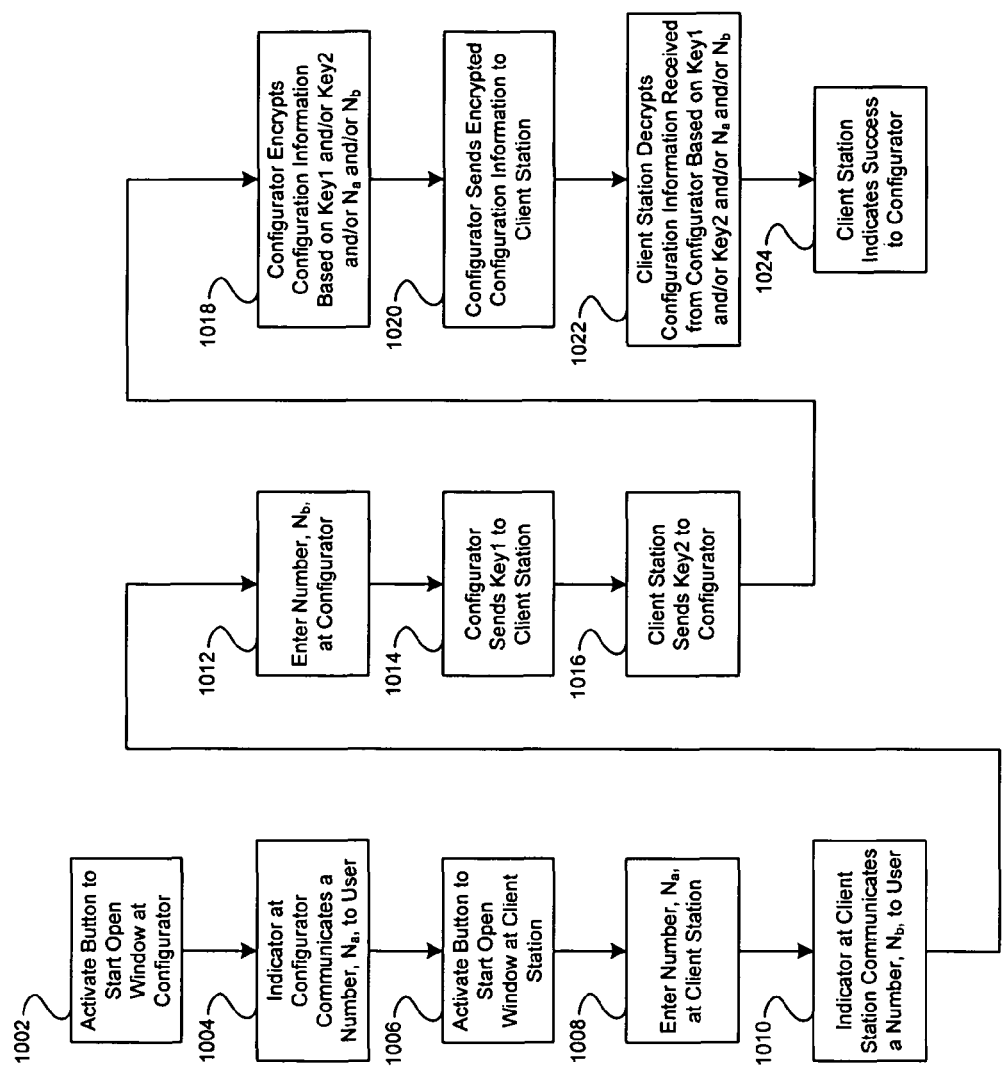
FIG. 10 is a flowchart illustrating exemplary steps for improved authentication for communications network setup that utilizes a sequence of automatically generated seed number inputs, in accordance with an embodiment of the invention.

FIG. 10 is a flowchart illustrating exemplary steps for improved authentication for communications network setup that utilizes a sequence of automatically generated seed number inputs, in accordance with an embodiment of the invention. In the flowchart illustrated in FIG. 10, the configurator 102 may generate a configurator seed number that is subsequently entered at the client station 104. The client station 104 may generate a client seed number that is subsequently entered at the configurator 102. Step 1002 may be substantially as described in step 802 in which a button is activated to start opening of the configurator registration window at the configurator 102. Step 1004 may be substantially as described in step 804 in which an indicator at the configurator 102 communicates a number $N_a$ to a user. Step 1006 may be substantially as described in step 806 in which a button is activated to start opening of the client window at the client station 104. Step 1008 may be substantially as described in step 808 in which the number $N_a$, or a representation thereof, is entered at the client station 104.

In step 1010, an indicator at the client station 104 may communicate a number, $N_b$, to a user. The indicator may be visual and/or audible. The indicator may comprise a visual indication, for example, an illumination LED that flashes a number of times corresponding to the number $N_b$, or a number displayed in a user interface. The indicator may comprise an audible indication, for example, one or more tones that indicate, either by frequency of the tone, or by a number of beeps of the one or more tones, a number corresponding to the number $N_b$. In step 1012 a number corresponding to the number $N_b$ may be entered at the configurator 102. The client seed number $N_b$ may not be communicated between the configurator 102 and the client station 104 via an RF channel.

Step 1014 may be substantially as described in step 810 in which the configurator 102 sends key1 to the client station 104. Step 1016 may be substantially as described in step 812 in which the client station sends key2 to the configurator 102. In step 1018, the configurator 102 may utilize the key1, and/or key2, and/or the configurator seed number $N_a$, and/or the client seed number $N_b$ to generate an encryption key that is subsequently utilized to encrypt configuration information. Step 1020 may be substantially as described in step 816 in which the configurator 102 sends encrypted information to the client station 104. In step 1022, the client station 104 may utilize the key1, and/or key2, and/or the configurator seed number $N_a$, and/or the client seed number $N_b$ to generate a decryption key that is subsequently utilized to decrypt the encrypted configuration information. Step 1024 may be substantially as described in step 820 in which the client station indicates a successful configuration status to the configurator 102.

The number $N_a$ may be randomly chosen by the configurator 102 from among a range of numbers comprising 1 to a value $N_{max2}$ inclusive. For example, the value $N_{max2}$ may be in a range from 5 to 7 inclusive. The value $N_{max2}$ may alternatively be a value greater than or equal to 1, and less than or equal to 9. A user may verify that the configurator registration window is open based on, for example, a light emitting diode (LED) being illuminated continuously for a time duration of, for example, 5 seconds. The configurator 102 may subsequently communicate a value of the configurator seed number $N_a$ by, for example, blinking an LED, a number $N_a$ times in a cycle, pausing for a period of time, for example 1 or 2 seconds, and repeating the blinking of the LED for a subsequent cycle of blinks. The user may, for example, count the number of blinks of the LED in a cycle, or time interval, to determine the value of the configurator seed number $N_a$.

The user may verify that the client window is open based on, for example, an LED being illuminated continuously for a time duration, for example, 5 seconds, or by an indication in a user interface at the client station 104. The user may enter the value of the configurator seed number $N_a$ at a client station 104 by, for example, pressing a button at the client station 104 $N_a$ number of times, or by activating a button in a numeric keyboard that corresponds to the configurator seed number $N_a$. The client seed number $N_b$ may be randomly chosen, by the client station 104, from among a range of numbers comprising 1 to a value $N_{max3}$ inclusive. The client station 104 may subsequently communicate a value of the client seed number $N_b$ by, for example, blinking an LED, a number $N_b$ times in a cycle, or time interval, pausing for a period of time, for example 1 or 2 seconds, and repeating the blinking of the LED for a subsequent cycle of blinks. The user may, for example, count the number of blinks of the LED in a cycle, or time interval, to determine the value of the client seed number $N_b$. The user may enter the value of the client seed number $N_b$ at the configurator 102 by, for example, pressing a button at the configurator 102 $N_b$ number of times.

The client station 104, and configurator 102 may utilize the configurator seed number $N_a$ and the client seed number $N_b$ as a shared secret, S. The shared secret S may be generated, for example, by concatenating bits comprising the configurator seed number, and bits comprising the client seed number. For example, if the numbers $N_{max2}$ and $N_{max3}$ are equal to about 3, then the shared secret S may be generated by concatenating the bits comprising the configurator seed number, and the bits comprising the client seed number, to generate a shared secret S. The shared secret S may, for example, comprise 4 binary bits, which give a range of values from 0 to 15. The configurator seed number $N_a$ and the client seed number $N_b$ may be utilized in, for example, an authenticated Diffie-Hellman exchange further comprising ESP-KE, SPEKE, PAK, or EKE protocols, for example.

Various embodiments of the invention may comprise a plurality of button activations. At the configurator 102, there may be a range of button activations comprising a minimum of 1 button activation, and a maximum of about $N_{max2}$ button activations. At the client station 104, there may be a range of button activations comprising a minimum of 1 button activation, and a maximum of about $N_{max2}$ button activations, when $N_{max3}=N_{max2}$. A maximum total number of button activations between the configurator 102 and the client station 104 may equal about $1+2*N_{max2}$. An average total number of button activations between the configurator 102 and the client station 104 may equal about $1+(N_{max2}+1)$. A number of unique shared secrets, S, may be about $(N_{max2})^2$. For example, if $N_{max2}=5$, the maximum total number of button activations may be 11, the average total number of button activations may be 7, and the number of unique shared secrets may be 25. For example, if $N_{max2}=4$, the maximum total number of button activations may be 9, the average total number of button activations may be 6, and the number of unique shared secrets may be 16. For example, if $N_{max2}=3$, the maximum total number of button activations may be 7, the average total number of button activations may be 5, and the number of unique shared secrets may be 9.

Figure 11:
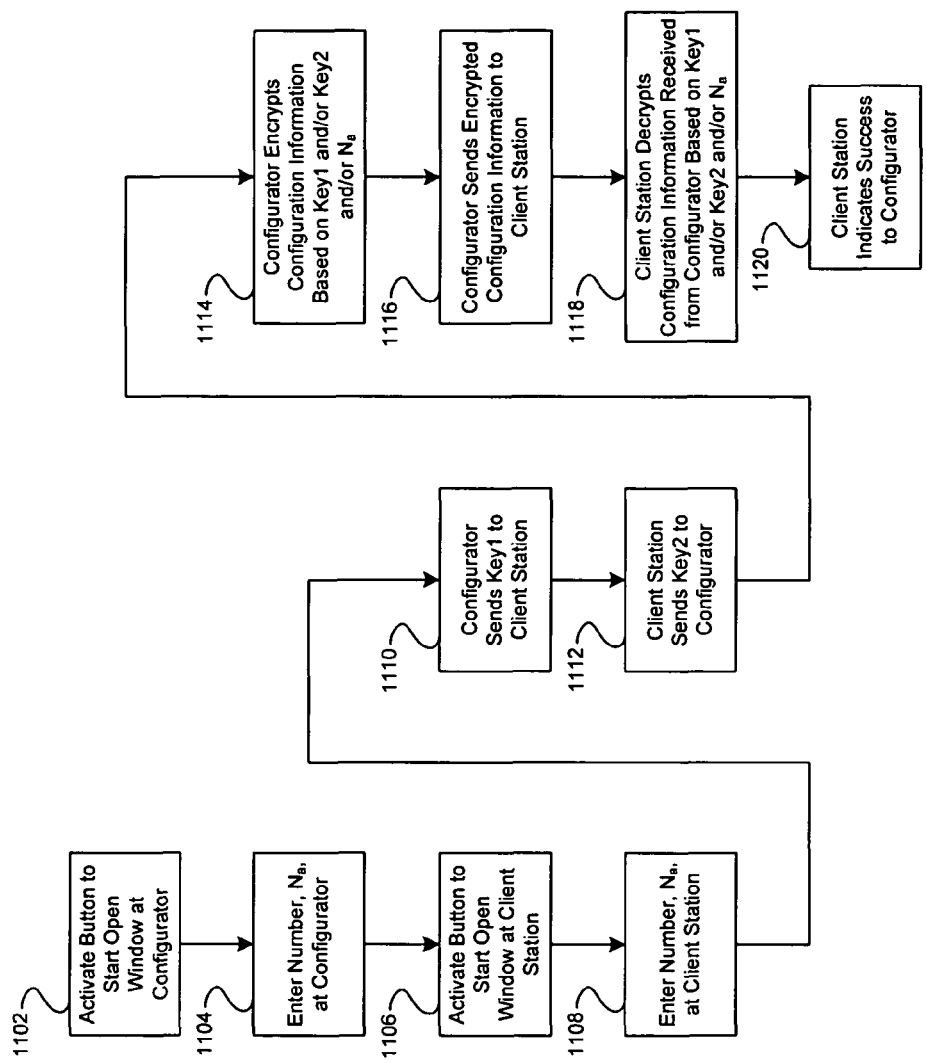
FIG. 11 is a flowchart illustrating exemplary steps for improved authentication for communications network setup that utilizes a user generated seed number input, in accordance with an embodiment of the invention.

FIG. 11 is a flowchart illustrating exemplary steps for improved authentication for communications network setup that utilizes a user generated seed number input, in accordance with an embodiment of the invention. The flowchart illustrated in FIG. 11 differs from that of FIG. 8 in that in FIG. 11, the configurator seed number $N_a$ may be selected by the user. Step 1102 may be substantially as described in 802 where a button is activated to start opening of the configurator registration window at the configurator 102. In step 1104, a number corresponding to the user selected configurator seed number $N_a$ may be entered at the configurator 102. Step 1106 may be substantially as described in step 806 in which a button is activated to start opening of the client window at the client station 104.

Step 1108 may be substantially as described in step 808 in which the number $N_a$ or a representation thereof is entered at the client station 104. Step 1110 may be substantially as described in step 810 in which the configurator 102 sends key1 to the client station 104. Step 1112 may be substantially as described in step 812 in which the client station 104 sends key2 to the configurator 102. Step 1114 may be substantially as described in step 814 in which the configurator 102 encrypts configuration information based on key1, key2, and/or $N_a$. Step 1116 may be substantially as described in step 816 in which the configurator 102 sends encrypted information to the client station 104. Step 1118 may be substantially as described in step 818 in which the client station 104 decrypts configuration information based on key1, key2, and/or $N_a$. Step 1120 may be substantially as described in step 820 in which the client station indicates success to the configurator 102.

Figure 12:
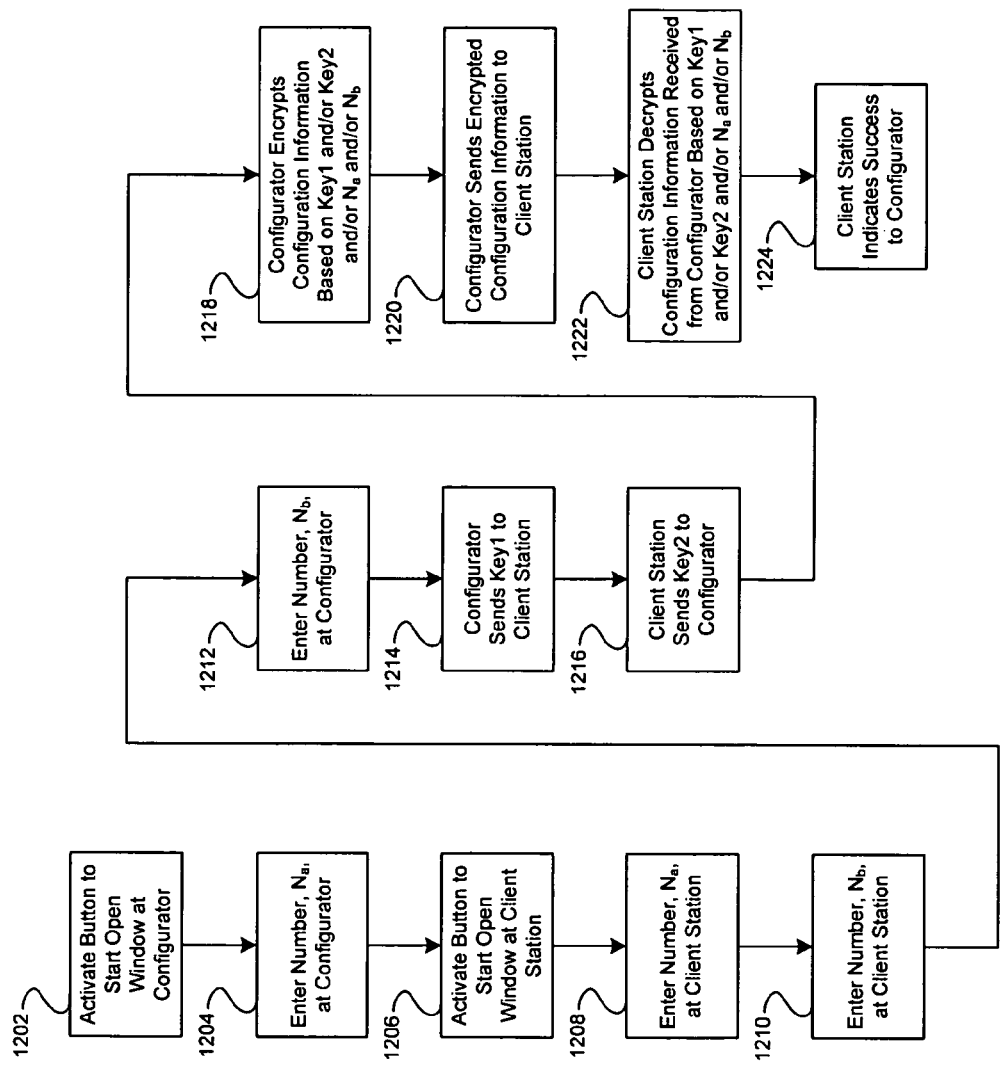
FIG. 12 is a flowchart illustrating exemplary steps for improved authentication for communications network setup that utilizes a sequence of user generated seed number inputs, in accordance with an embodiment of the invention.

FIG. 12 is a flowchart illustrating exemplary steps for improved authentication for communications network setup that utilizes a sequence of user generated seed number inputs, in accordance with an embodiment of the invention. The flowchart illustrated in FIG. 12 differs from that of FIG. 10 in that in FIG. 12, the configurator seed number $N_a$ and the client seed number $N_b$ may be selected by the user. Step 1202 may be substantially as described in 1002 where a button is activated to start opening of the configurator registration window at the configurator 102. In step 1204, a number corresponding to the user selected configurator seed number $N_a$ may be entered at the configurator 102.

Step 1206 may be substantially as described in step 1006 in which a button is activated to start opening of the client window at the client station 104. Step 1208 may be substantially as described in step 1008 in which the number $N_a$ or a representation thereof is entered at the client station 104. In step 1210, a number corresponding to the user selected client seed number $N_b$ may be entered at the client station 104. Step 1212 may be substantially as described in step 1012 in which the client seed $N_b$ number is entered at the configurator 102. Step 1214 may be substantially as described in step 1014 in which the configurator 102 sends key1 to the client station 104.

Step 1216 may be substantially as described in step 1016 in which the client station sends key2 to the configurator 102. Step 1218 may be substantially as described in step 1018 in which the configurator 102 encrypts configuration information based on key1, key2, the configurator seed number $N_a$ and/or the client seed number $N_b$. Step 1220 may be substantially as described in step 1020 in which the configurator 102 sends encrypted information to the client station 104. Step 1222 may be substantially as described in step 1022 in which the client station 104 decrypts configuration information based on key1, key2, the configurator seed number $N_a$ and/or the client seed number $N_b$. Step 1224 may be substantially as described in step 1024 in which the client station indicates successful configuration to the configurator 102.

Figure 13:
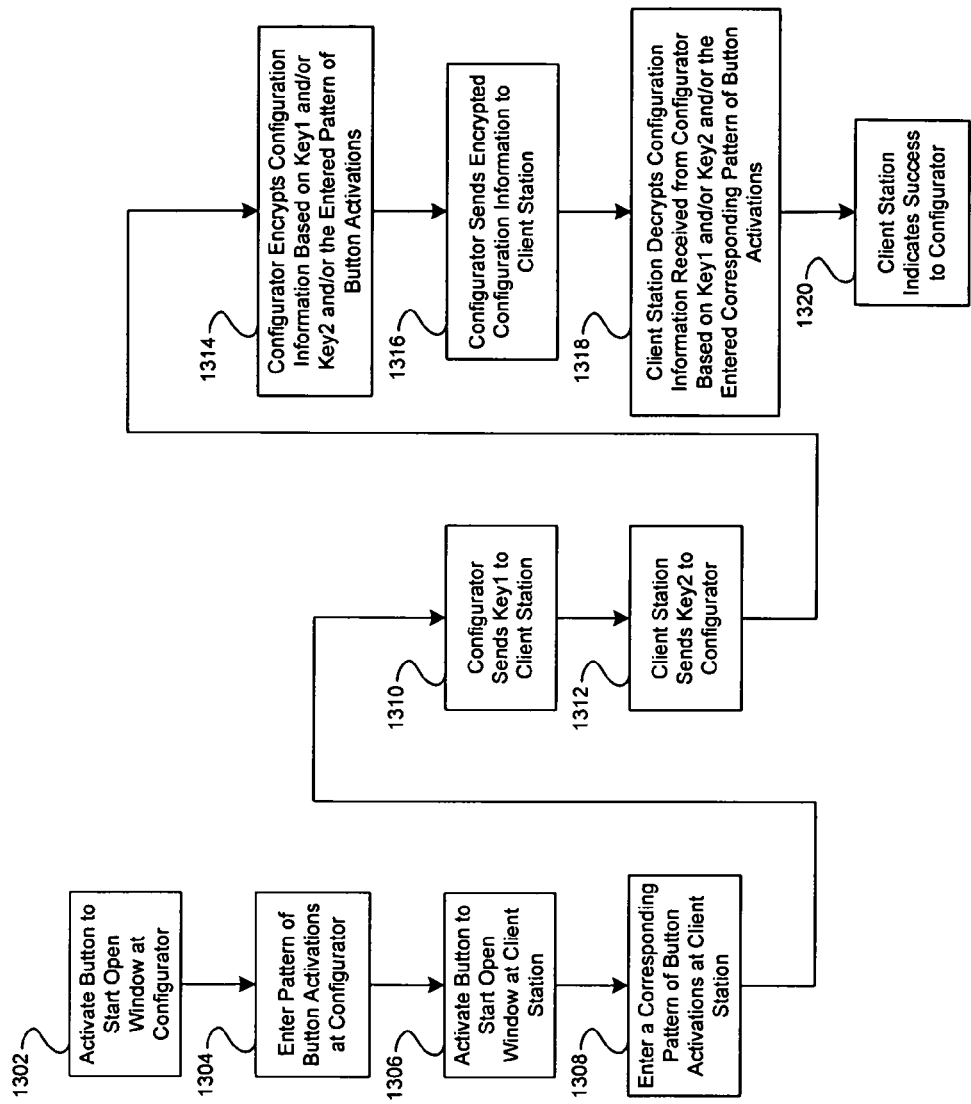
FIG. 13 is a flowchart illustrating exemplary steps for improved authentication for communications network setup that utilizes a pattern of button activations, in accordance with an embodiment of the invention.

FIG. 13 is a flowchart illustrating exemplary steps for improved authentication for communications network setup that utilizes a pattern of button activations, in accordance with an embodiment of the invention. The flowchart illustrated in FIG. 13 differs from that of FIG. 11 in that in FIG. 13, a configurator seed may comprise a pattern of button activations, utilizing one button, or a plurality buttons at a configurator 102, as selected by the user. The pattern of button activations may comprise a plurality of activations of a button among the plurality of buttons. The pattern of button activations may comprise one activation, or a plurality of activations, of a button, followed by a pause, followed by a subsequent one activation, or plurality of activations, of the button.

Step 1302 may be substantially as described in step 1102 where a button is activated to start opening of the configurator registration window at the configurator 102. In step 1304, a pattern of button activations may be entered at the configurator 102. Step 1306 may be substantially as described in step 1106 in which a button is activated to start opening of the client window at the client station 104. In step 1308 a pattern of button activations may be entered at the client station 104 corresponding to the pattern of button activations entered at the configurator 102. The pattern of button activations entered at the client station 104 may utilize one button or a plurality of buttons. Step 1310 may be substantially as described in step 1110 in which the configurator 102 sends key1 to the client station 104. Step 1312 may be substantially as described in step 1112 in which the client station sends key2 to the configurator 102.

In step 1314, the configurator 102 may utilize the pattern of button activations entered at the configurator 102 to generate an encryption key that is subsequently utilized to encrypt configuration information. Step 1316 may be substantially as described in step 1116 in which the configurator 102 sends encrypted information to the client station 104. In step 1318, the client station 104 may utilize the corresponding pattern of button activations entered at the client station 104 to generate a decryption key that is subsequently utilized to decrypt the encrypted configuration information. Step 1320 may be substantially as described in step 1120 in which the client station indicates successful configuration to the configurator 102.

Aspects of various embodiments of the invention may be combined. For example, a user may select a configurator seed number $N_a$ that may be entered at the configurator 102 and at the client station 104. The user may also select a pattern of button activations at a client station 104 that may be entered at the client station 104 and at the configurator 102. The configurator 102 may generate an encryption key based on the configurator seed number and/or the pattern of button activations selected by the user at the client station 104. The client station 104 may generate a decryption key based on the configurator seed number and/or the pattern of button activations selected by the user at the client station 104.

Similarly, the user may select a client seed number $N_b$ that may be entered at the client station 104 and at the configurator 102. The user may also select a pattern of button activations at the configurator 102 that may be entered at the configurator 102 and at the client station 104. The configurator 102 may generate an encryption key based on the client seed number and/or the pattern of button activations selected by the user at the configurator 102. The client station 104 may generate a decryption key based on the client seed number and/or the pattern of button activations selected by the user at the configurator 102.

In accordance with an embodiment of the invention, when a configurator generates a configurator seed number, the generated configuration seed number may be indicated via an audio indication and/or visual indication. When the generated configuration seed number is communicated to and received at the client station, for example, via a manual input, the receipt of the configurator seed number is done asynchronously from the audible indication and/or said visual indication.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling secure wireless communication of information in a communication system, the method comprising:

initiating configuration of a client station by a configurator in an IEEE 802.11 communication system;

communicating configuration information between said configurator and said client station via an RF communication channel communicatively coupling said configurator and said client station;

configuring said client station to securely communicate within said IEEE 802.11 communication system based on said communicated configuration information, locally stored information on said configurator and locally stored information on said client station, wherein said locally stored information is communicated using non-RF communications;

wherein said communicating configuration information comprises reporting a generated configurator seed number utilizing one or both of an audible indication and/or a visual indication; and wherein said generated configurator seed number is communicated to said client station asynchronously from said one or both of said audible indication and/or said visual indication.

2. The method according to claim 1, comprising communicating a configurator key from said configurator to said client station.

3. The method according to claim 2, comprising receiving from said client station, a client key at said configurator.

4. The method according to claim 3, the method comprising encrypting said configuration information at said configurator based on said configurator key, said client key, and said configurator seed number.

5. The method according to claim 4, comprising receiving by said configurator, an input corresponding to said configurator seed number, which is also received by said client station.

6. The method according to claim 5, wherein said input corresponding to said configurator seed number comprises a pattern of button activations.

7. The method according to claim 4, comprising communicating said encrypted configuration information from said configurator to said client station.

8. The method according to claim 1, comprising activating a confirmation button at said configurator.

9. A non-transitory computer readable medium having stored thereon, a computer program having at least one code section for enabling secure wireless communication of information in a communication system, the at least one code section being executable by a computer for causing the computer to perform steps comprising:

initiating configuration of a client station by a configurator in an IEEE 802.11 communication system;

communicating configuration information between said configurator and said client station via an RF communication channel communicatively coupling said configurator and said client station;

configuring said client station to securely communicate within said IEEE 802.11 communication system based on said communicated configuration information, locally stored information on said configurator and locally stored information on said client station, wherein said locally stored information is communicated using non-RF communications;

wherein said communicating configuration information comprises reporting a generated configurator seed number utilizing one or both of an audible indication and/or a visual indication; and wherein said generated configurator seed number is communicated to said client station asynchronously from said one or both of said audible indication and/or said visual indication.

10. The non-transitory computer readable medium according to claim 9, wherein said at least one code section comprises code for communicating a configurator key from said configurator to said client station.

11. The non-transitory computer readable medium according to claim 10, wherein said at least one code section comprises code for receiving from said client station, a client key at said configurator.

12. The non-transitory computer readable medium according to claim 11, wherein said at least one code section comprises code for encrypting said configuration information at said configurator based on said configurator key, said client key, and said configurator seed number.

13. The non-transitory computer readable medium according to claim 12, wherein said at least one code section comprises code for receiving by said configurator, an input corresponding to said configurator seed number, which is also received by said client station.

14. The non-transitory computer readable medium according to claim 13, wherein said input corresponding to said configurator seed number comprises a pattern of button activations.

15. The non-transitory computer readable medium according to claim 12, wherein said at least one code section comprises code for communicating said encrypted configuration information from said configurator to said client station.

16. The non-transitory computer readable medium according to claim 9, wherein said at least one code section comprises code for activating a confirmation button at said configurator.

17. A system for enabling secure wireless communication of information in a communication system, the system comprising:

one or more circuits for use in a configurator, said one or more circuits are operable to initiate configuration of a client station in an IEEE 802.11 communication system;

said one or more circuits are operable to communicate configuration information between said configurator and said client station via an RF communication channel communicatively coupling said configurator and said client station;

wherein said one or more circuits operable to communicate configuration information comprises one or more circuits operable to report a generated configurator seed number utilizing one or both of an audible indication and/or a visual indication; and wherein said generated configurator seed number is communicated to said client station asynchronously from said one or both of said audible indication and/or said visual indication; and said one or more circuits are operable to configure said client station to securely communicate within said IEEE 802.11 communication system based on said communicated configuration information, locally stored information on said configurator and locally stored information on said client station, wherein said locally stored information is communicated using non-RF communications.

18. The system according to claim 17, wherein said one or more circuits are operable to communicate a configurator key to said client station.

19. The system according to claim 18, wherein said one or more circuits are operable to receive a client key from said client station.

20. The system according to claim, 19 wherein said one or more circuits are operable to encrypt said configuration information at said configurator based on said configurator key, said client key, and said configurator seed number.

21. The system according to claim 20, wherein said one or more circuits are operable to receive an input corresponding to said configurator seed number, which is also received by said client station.

22. The system according to claim 21, wherein said input corresponding to said configurator seed number comprises a pattern of button activations.

23. The system according to claim 20, wherein said one or more circuits are operable to communicate said encrypted configuration information to said client station.

24. The system according to claim 17, wherein said one or more circuits are operable to activate a confirmation button at said configurator.

25. A method for enabling secure wireless communication of information in a communication system, the method comprising:
configuring a client station by a configurator to securely communicate within an IEEE 802.11 communication system based on exchanged configuration information between said configurator and said client station, locally stored information on said configurator and locally stored information on said client station, wherein said locally stored information on said configurator comprises a generated configurator seed number; and
reporting said generated configurator seed number utilizing one or both of:
an audible indication and/or a visual indication, wherein said generated configurator seed number is communicated to said client station asynchronously from said one or both of:
said audible indication and/or said visual indication.

26. A non-transitory computer readable medium having stored thereon, a computer program having at least one code section for enabling secure wireless communication of information in a communication system, the at least one code section being executable by a computer for causing the computer to perform steps comprising:
configuring a client station by a configurator to securely communicate within an IEEE 802.11 communication system based on exchanged configuration information between said configurator and said client station, locally stored information on said configurator and locally stored information on said client station, wherein said locally stored information on said configurator comprises a generated configurator seed number; and
reporting said generated configurator seed number utilizing one or both of:
an audible indication and/or a visual indication, wherein said generated configurator seed number is communicated to said client station asynchronously from said one or both of:
said audible indication and/or said visual indication.

27. A system for enabling secure wireless communication of information in a communication system, the system comprising:
one or more circuits for use in a configurator, said one or more circuits are operable to configure a client station to securely communicate within an IEEE 802.11 communication system based on exchanged configuration information between said configurator and said client station, locally stored information on said configurator and locally stored information on said client station, wherein said locally stored information on said configurator comprises a generated configurator seed number; and
said one or more circuits are operable to report said generated configurator seed number utilizing one or both of:
an audible indication and/or a visual indication, wherein said generated configurator seed number is communicated to said client station asynchronously from said one or both of:
said audible indication and/or said visual indication.

* * * * *